(12) United States Patent
Hanamoto et al.

(10) Patent No.: US 8,226,747 B2
(45) Date of Patent: Jul. 24, 2012

(54) ADSORBENT, PROCESS FOR PRODUCING THE SAME, CANISTER AND METHOD FOR USING THE SAME

(75) Inventors: Tetsuya Hanamoto, Okayama-ken (JP); Susumu Abe, Okayama-ken (JP); Kenichi Ishikawa, Osaka-fu (JP)

(73) Assignee: Kuraray Chemical Co., Ltd., Bizen-shi (JP)

( * ) Notice: Subject to any disclaimer, the term of this patent is extended or adjusted under 35 U.S.C. 154(b) by 264 days.

(21) Appl. No.: 12/528,729

(22) PCT Filed: Aug. 29, 2008

(86) PCT No.: PCT/JP2008/065527
§ 371 (c)(1),
(2), (4) Date: Aug. 26, 2009

(87) PCT Pub. No.: WO2009/031467
PCT Pub. Date: Mar. 12, 2009

(65) Prior Publication Data
US 2010/0212496 A1    Aug. 26, 2010

(30) Foreign Application Priority Data
Sep. 7, 2007   (JP) .................................. 2007-232537

(51) Int. Cl.
*B01D 53/02*   (2006.01)
(52) U.S. Cl. ............. 95/146; 96/108; 502/400; 502/416
(58) Field of Classification Search .................... 95/146; 96/108; 502/400, 416
See application file for complete search history.

(56) References Cited

U.S. PATENT DOCUMENTS
4,060,508 A * 11/1977 Sugahara et al. ............. 523/440
(Continued)

FOREIGN PATENT DOCUMENTS
JP   59 69146   4/1984
(Continued)

OTHER PUBLICATIONS
Zhang, B. et al., "Starch Gel Templating of Spongelike Macroporous Silicalite Monoliths and Mesoporous Films," Chemistry of Materials, vol. 14, No. 3, pp. 1369-1374, Jan. 19, 2002.

*Primary Examiner* — Robert J Hill, Jr.
*Assistant Examiner* — Christopher P Jones
(74) *Attorney, Agent, or Firm* — Oblon, Spivak, McClelland, Maier & Neustadt, L.L.P.

(57) ABSTRACT

An object of the present invention is to provide an adsorbent suitable as an adsorbent for a canister which is capable of reducing an amount of evaporated fuel gas released into the atmosphere even where a motor vehicle is allowed to park for a prolonged period of time, a process for producing the adsorbent as well as a canister using the adsorbent and a method for using the canister. The above object can be accomplished by an adsorbent in which an integrated volume of pores having an average diameter of 3,000 to 100,000 nm as measured with a mercury porosimeter is 6.5 mL/dl or more and an equilibrium adsorption as measured in an n-butane volume concentration of 2,000 ppm is 0.16 g/dL or more, a process for producing the adsorbent, as well as a canister and a method for using the canister.

6 Claims, 4 Drawing Sheets

U.S. PATENT DOCUMENTS

| | | | |
|---|---|---|---|
| 4,170,129 A * | 10/1979 | Lowell | 73/38 |
| 4,339,557 A * | 7/1982 | Hasuo et al. | 525/247 |
| 4,677,086 A | 6/1987 | McCue | |
| 4,822,350 A * | 4/1989 | Ito et al. | 604/372 |
| 5,204,310 A | 4/1993 | Tolles et al. | |
| 5,885,638 A * | 3/1999 | Takayanagi et al. | 426/271 |
| 6,395,381 B1 * | 5/2002 | Kondo et al. | 428/317.9 |
| 6,540,815 B1 | 4/2003 | Hiltzik et al. | |
| 2006/0141256 A1 | 6/2006 | Ishikawa et al. | |
| 2007/0078056 A1 | 4/2007 | Abe et al. | |
| 2009/0038477 A1 * | 2/2009 | Abe et al. | 96/154 |

FOREIGN PATENT DOCUMENTS

| | | |
|---|---|---|
| JP | 63 57351 | 4/1988 |
| JP | 63 242343 | 10/1988 |
| JP | 64 36961 | 2/1989 |
| JP | 5 146678 | 6/1993 |
| JP | 6 9208 | 1/1994 |
| JP | 10 37812 | 2/1998 |
| JP | 2002 256989 | 9/2002 |
| JP | 2006 214403 | 8/2006 |
| JP | 2007 107518 | 4/2007 |
| JP | 2007 117863 | 5/2007 |

\* cited by examiner

Canister real machine

ADSORBENT, PROCESS FOR PRODUCING THE SAME, CANISTER AND METHOD FOR USING THE SAME

TECHNICAL FIELD

The present invention relates to an adsorbent, a process for producing the adsorbent, a canister and a method for using the canister. More particularly, the present invention relates to an adsorbent which is suitable for the prevention of fuel evaporation, excellent in performance of adsorption and desorption (hereinafter, adsorption and desorption are simply referred to as adsorption/desorption) and smaller in evaporation of fuel gas into the atmosphere when a motor vehicle is allowed to park for a prolonged period of time, a process for producing the adsorbent, a canister using the adsorbent and a method for using the canister.

BACKGROUND ART

In recent years with the increased attention focused on improvements in the atmospheric environment and global warming prevention, an evaporated fuel suppressing apparatus (canister) is used for the purpose of reducing the release of evaporated fuel gas into the atmosphere from a fuel tank of a gasoline internal combustion engine. In general, an adsorptive material such as activated carbon is filled into the apparatus, by which evaporated fuel is adsorbed and trapped. Further, during the running of an engine, combustion air is introduced into the canister to desorb the thus adsorbed evaporated fuel, thereby allowing the fuel to burn inside the engine.

However, it is known that, when activated carbon is used as it is to carry out the adsorption/desorption of evaporated fuel gas, an exothermic reaction takes place to rise in temperature on adsorption, whereas an endothermic reaction takes place to decrease in temperature on desorption, thus resulting in reduced performance of adsorption/desorption. It is, therefore, known that in order to solve the above problem, a heat storage material is used in combination or activated carbon is increased in specific heat. For example, it has been proposed that a heat storage material is used inside a porous material such as activated carbon (Patent Document 1) and that activated carbon is allowed to contain a liquid great in specific heat, thereby increasing the specific heat (Patent Document 2).

Patent Document 1: Japanese Published Unexamined Utility Model Application No. Sho-63-57351
Patent Document 2: Japanese Published Unexamined Patent Application No. Sho-64-36961

In recent years, in the United States, strict regulations have been imposed on evaporated fuel gas and the amount of fuel gas to be evaporated from a motor vehicle parking for 72 hours (DBL: diurnal breathing loss) has also been regulated. Thus, there is the necessity that not only fuel gas evaporated from a motor vehicle is simply subjected to adsorption/desorption but also that these regulations are complied with by suppressing fuel gas resulting from motor vehicles parking for a prolonged time which evaporates into the atmosphere.

The applicant of the present invention previously developed as a fuel-evaporation preventing apparatus capable of complying with the above regulations a fuel-evaporation preventing apparatus in which a second canister made up of honeycomb activated carbon is connected to a first canister and filed a patent application (Patent Document 3). The fuel-evaporation preventing apparatus is able to reduce the evaporation of fuel gas into the atmosphere even for a motor vehicle parking for a prolonged period of time only by connecting a small-sized second canister constituted with honeycomb activated carbon in series with a first canister, which is therefore useful.

Patent Document 3: Japanese Published Unexamined Patent Application No. Hei-10-37812

There has also been proposed a canister which combines an adsorbent having the adsorption capacity of greater than 35 g n-butane/L (liter) between vapor concentrations of 5 vol % and 50 vol % with an adsorbent having the adsorption capacity of less than 35 g n-butane/L (liter) between vapor concentrations of 5 vol % and 50 vol % (Patent Document 4).

Patent Document 4: U.S. Pat. No. 6,540,815

The canisters described in Patent Document 3 and Patent Document 4 are able to suppress a leakage amount of gasoline even for a motor vehicle parking for a prolonged period of time by connecting a second canister in series with a canister in which granular activated carbon is used. These Patent Documents have disclosed that honeycomb-shaped activated carbon is used in a second canister. However, the honeycomb-shaped body described in Patent Document 3 is produced by extrusion molding and easily broken. Further, Patent Document 4 has also described the use of a honeycomb structure, which is made of ceramic, and also easily broken although lower in air flow resistance.

In recent years, a request has been made for activated carbon which is greater in strength against vibration in view of being mounted on a motor vehicle, and a problem with strength has been particularly pointed out in a conventional activated carbon honeycomb structure. Further, where the activated carbon honeycomb structure is installed inside a canister, a sealing material such as an O-ring is needed, thus posing another problem that production costs are higher. On the other hand, there is known a canister into which plural types of activated carbon different in performance of adsorption/desorption are filled. This canister is constituted by filling activated carbon A great in adsorption amount of evaporated fuel and weak in retaining force into a first adsorbent layer (main chamber) and activated carbon moderate in adsorption amount of evaporated fuel and weak in retaining force into a second and subsequent adsorbent layers (auxiliary chambers) (Patent Document 5).

Patent Document 5: Japanese Published Unexamined Patent Application No. 2002-256989

The performance of a canister is indicated by a butane working capacity (BWC), which is the mean of an increase in a predetermined amount of n-butane adsorbed on a canister into which activated carbon is filled and a decrease of n-butane desorbed by air. However, in general, where a carbon material is granulated, carbonized and activated according to an ordinary method to produce activated carbon, the activated carbon is decreased in apparent density with an increase in performance of the BWC and decreased in specific heat accordingly.

In order to prevent the above problem, a method is available in which activated carbon powder is granulated with a binder and used as granular activated carbon. For example, there is known shaped activated carbon made up of wood-based granular activated carbon and bentonite clay and described that the activated carbon is used in a canister (Patent Document 6). However, the applicant of the present invention has examined in detail this shaped activated carbon, finding that the activated carbon is heavily affected for adsorptivity and adsorption speed by the binder and not necessarily satisfactory in performance.

Patent Document 6: Japanese Published Unexamined Patent Application No. Sho-63-242343

There is also disclosed a process for producing an adsorbent in which powdery activated carbon, bentonite, and an inorganic adhesive agent are mixed at a ratio of 40-70 to 10-30 to 10-40, then, water is added to a resultant mixture of 80-120% by weight with respect to the mixture and shaped into a filter form (Patent Document 7). However, as apparent from the examples, the adsorbent disclosed therein is a plate-like adsorbent shaped by using a mold, and the method disclosed in Patent Document 7 is unable to provide granular activated carbon usable in practice.

Patent Document 7: Japanese Published Unexamined Patent Application No. Sho-59-69146

DISCLOSURE OF THE INVENTION

Problems to be Solved by the Invention

Therefore, an object of the present invention is to provide an adsorbent suitable as an adsorbent for a canister which is capable of reducing an amount of evaporated fuel gas released into the atmosphere even where a motor vehicle is allowed to park for a prolonged period of time, a process for producing the adsorbent as well as a canister using the adsorbent and a method for using the canister.

Means for Solving the Problem

In order to attain the above object, the inventors studied diligently, found that the object could be achieved by an adsorbent in which a certain amount or more of the cavities in a specific range were formed and which satisfies an n-butane equilibrium adsorption in a specific low-concentration of n-butane, and arrived at the present invention. More specifically, a first invention of the present invention is an adsorbent in which an integrated volume of pores having an average diameter in the range of 3,000 to 100,000 nm as measured with a mercury porosimeter is 6.5 mL/dL or more and an equilibrium adsorption as measured in an n-butane volume concentration of 2,000 ppm is 0.16 g/dL or more.

Further, a second invention thereof is a process for producing the adsorbent in which powdery or granular activated carbon, a smoothing agent, an inorganic compound soluble in acid, a binder, and water are mixed and granulated, a resultant is dried, thereafter, subjected to particle size regulation, washing by acid, drying and subjecting to final particle size regulation.

Still further, a third invention thereof is a canister having the adsorbent, and a fourth invention thereof is a method for using the canister in which an n-butane working capacity in an evaporated fuel gas adsorbent is defined as a (g/dl) and a used amount is defined as b (mL) to give a×b/100 which is 2.7 g or more.

Effect of the Invention

The adsorbent of the present invention is greater in desorption rate. The gas adsorbed such as evaporated fuel gas can be desorbed by using a small amount of purged air. The adsorbed substances remained in the adsorbent is small in quantity. And, the adsorbent has an adsorptivity at low concentrations. Thus, the adsorbent is suitable as an evaporated fuel gas adsorbent for motor vehicles. It is, therefore, possible to reduce an amount of evaporated fuel gas released into the atmosphere when a motor vehicle is allowed to park for a prolonged period of time. Where this type of adsorbent is used in a canister, it is preferable that the adsorbent is arranged at least on a second layer or thereafter in a canister having a plurality of divided adsorbent layers or arranged at a second canister in a canister which is equipped with the second canister.

BEST MODE FOR CARRYING OUT THE INVENTION

No specific limitations are imposed on a carbonaceous material that is a raw material of the activated carbon of the present invention as long as it forms activated carbon by activation. The carbonaceous material may be selected from various categories, i.e., from a plant-based material, a mineral-based material, a natural material, and a synthetic material. In more detail, wood, charcoal, or fruit shells, such as coconut shells, can be mentioned as a plant-based carbonaceous material. Mineral coal, petroleum and/or coal-tar pitch or coke can be mentioned as a mineral-based carbonaceous material. Natural fiber, such as cotton or flax, regenerated fiber, such as rayon or viscose rayon, or semisynthetic fiber, such as acetate or triacetate, can be mentioned as a natural material. Polyamide resin, such as nylon, polyvinyl alcohol resin, such as vinylon, polyacrylonitrile resin, such as acrylic, polyolefin resin, such as polyethylene or polypropylene, polyurethane resin, phenol resin, or polyvinyl chloride resin can be mentioned as a synthetic material. These may be mixed together.

The carbonaceous material has no specific limitations on its shape, and can have various shapes such as granular, powdery, fibrous, or sheet-like shape. A powdery or a granular carbonaceous material is preferably used in view of being granulated, and the granular size is preferably 0.3 mm or smaller. The carbonaceous material is carbonized and activated to produce activated carbon, and conventional conditions may be adopted for conditions of carbonizing and activating the material.

Where powdery or granular activated carbon has excessively small in median pore radius, the gas adsorbed is less likely to be desorbed due to excessively large adsorptivity of the activated carbon. Where powdery or granular activated carbon has excessively large in median pore radius, the gas adsorbed is small in quantity although desorptivity of the activated carbon is excellent. Therefore, a preferable median pore radius is from 3.5 nm to 6.0 nm.

In the present invention, powdery or granular activated carbon is granulated by adding a binder. The greatest feature of the present invention resides in that an inorganic compound soluble in acid is added, and a resultant is subjected to granulation, drying, and, thereafter, washing by acid-water, by which the inorganic compound is solved out to form cavities in an adsorbent.

The inorganic compound soluble in acid includes carbonates of alkaline earth metals (including magnesium carbonate), magnesium oxide and calcium hydroxide. Calcium carbonate is particularly preferable. Acids to be used here include hydrochloric acid, nitric acid, acetic acid, formic acid and citric acid. Hydrochloric acid is particularly preferable.

A mixture is made up of activated carbon (A), an inorganic compound soluble in acid (C), a binder (D), a smoothing agent (E) and water (F), and an aggregate (B) may be added as an auxiliary material in forming a skeleton. The aggregate (B) is preferably an inorganic substance resistant against acid and higher in melting point. More specifically, alumina, silicate (glass powder) and graphite are used singularly or in combination with two or more of them as the aggregate. Alumina is particularly preferable.

As the binder (D), preferable is a substance resistant against acid and heat as well as smaller in inhibiting the performance of adsorption/desorption, including, for example, polyurethane emulsion, acryl emulsion and so on.

The smoothing agent (E) for improving granulation properties includes at least one type of compound selected from the group consisting of bentonite-base, cellulose-base and polyvinyl alcohol-base compounds. Bentonite-base compounds include sodium bentonite, calcium bentonite and so on.

Cellulose-base compounds include cellulose and cellulose derivatives in which a hydroxyl group is substituted with alkyl ether or carboxylmethyl group. Methyl cellulose and carboxymethyl cellulose are particularly preferable. Polyvinyl alcohol-base compounds include polyvinyl alcohol and various types of modified polyvinyl alcohols.

In the adsorbent of the present invention, when the activated carbon (A) and the aggregate (B) are set to be 100 parts by weight, the inorganic compound soluble in acid (C) is preferably mixed at 10 parts by weight or more, more preferably mixed at 20 to 500 parts by weight, and still more preferably at 50 to 400 parts by weight.

When the activated carbon (A) and the aggregate (B) are set to be 100 parts by weight, the binder (D) is preferably mixed at 7 to 25 parts by weight on a dry solid basis and more preferably at 8 to 20 parts by weight.

When the activated carbon (A) and the aggregate (B) are set to be 100 parts by weight, the smoothing agent (E) is preferably mixed at 1 to 10 parts by weight, and more preferably at 2 to 7 parts by weight.

When the activated carbon (A) and the aggregate (B) are set to be 100 parts by weight, the water (F) is preferably mixed at 60 to 250 parts by weight.

When the activated carbon (A) and the aggregate (B) are set to be 100 parts by weight, the aggregate (B) is preferably mixed at 0 to 90 parts by weight and more preferably at 0 to 65 parts by weight.

A mixture made up of powdery or granular activated carbon (A), an aggregate (B), an inorganic compound soluble in acid (C), a binder (D), a smoothing agent (E) and water (F) is kneaded by using a kneader or others. The thus kneaded substance is then granulated by using a granulating machine such as a pelleter, dried at a temperature of 200° C. or lower, cooled at an ordinary temperature, and thereafter subjected to particle size regulation. An inorganic compound soluble in acid (C) is dissolved in an acid solution, which is added thereto. The resultant is washed sufficiently in a water bath, dried again at a temperature of 200° C. or lower, cooled at an ordinary temperature, and subjected to particle size regulation, thereby producing the adsorbent of the present invention. The adsorbent is preferably pelletized or formed in a granular or a spherical shape on handling. When the adsorbent is pelletized and the length of a pellet is given as L and the diameter is given as D, L/D is preferably from 0.5 to 4.

When such activated carbon that at least two types of activated carbon different in pore size distribution and/or adsorption characteristics are mixed is used as powdery or granular activated carbon, it is possible to easily produce granular activated carbon having any given pore size distribution. In this instance, the adsorption performance can be controlled arbitrarily, which is preferable.

In the adsorbent of the present invention, an integrated volume of pores having an average diameter in the range of 3,000 to 100,000 nm as measured with a mercury porosimeter is 6.5 mL/dL or more, preferably 7.5 mL/dl or more, and an equilibrium adsorption as measured in an n-butane volume concentration of 2,000 ppm is 0.16 g/dl or more, and preferably 0.2 g/dl or more. The adsorbent of the present invention is favorably used in a canister as an evaporated fuel gas adsorbent.

Where the adsorbent of the present invention is used in a canister, an n-butane desorption rate is preferably 78% or more and more preferably 80% or more. This type of adsorbent is preferably used in view of reduction in DBL by arranging this adsorbent at least on a second and a subsequent layer in a canister where an adsorbent layer is divided into a plurality of layers or by arranging the adsorbent in the second canister where a second canister is equipped with a canister. Where the adsorbent layer is divided into a plurality of layers, the adsorbent is preferably arranged in such a manner that as the layers move away from an evaporated fuel gas inhalation port to an atmosphere port, their adsorption capacity is decreased sequentially on every layer.

Where the adsorbent of the present invention is used at a site of the canister closest to the atmosphere, evaporated fuel gas flowing from a previous layer is decreased in concentration. Thereby, the adsorbent is required to be high in adsorptivity at low concentrations and to be 0.16 g/dl or more in adsorption at an n-butane concentration of 2,000 ppm. Further, in order that adsorption/desorption is carried out over two days to release no evaporated fuel gas into the atmosphere on measurement of the DBL, the adsorbent is needed in such a volume capable of adsorbing all evaporated fuel gas flowing from a previous layer into a site to be used. Therefore, an n-butane working capacity is expressed as a (g/dl) and a used volume is expressed as b (mL), the adsorbent is preferably used so that a×b/100 is 2.7 g or more.

Although a clear description cannot be necessarily given for the reason that the adsorbent of the present invention is excellent in adsorption/desorption of evaporated fuel gas, it is conceivable that cavities communicatively connected to the outside are formed, by which granules of activated carbon contact with air for desorption more efficiently, thus making it possible to desorb a greater amount of adsorption substances with a smaller amount of air for desorption.

A median pore radius of activated carbon used in production of the adsorbent of the present invention, n-butane adsorption/desorption rate of the adsorbent, and DBL, equilibrium concentration at an n-butane volume concentration of 2,000 ppm and volume of pores with a mercury porosimeter were measured as follows.

Median pore radius of activated carbon: Determination was made from a pore distribution curve according to a water vapor adsorption method. The activated carbon has pores, the pore radius of which is lower than a pore radius (r) determined according to the Kelvin equation expressed by the following formula (I) from a value (P) of saturated water vapor pressure at 30° C. under one atmospheric pressure (absolute pressure) inherent to a sulfuric acid concentration of a sulfuric acid aqueous solution. More specifically, a cumulative volume of pores lower than the pore radius determined on the basis of the Kelvin equation corresponds to the volume of water at 30° C. equivalent to a saturated adsorption on the measurement test thereof.

$$r = -[2 V_m \gamma \cos \Phi]/[RT \ln(P/P_0)] \tag{I}$$

r: pore radius (cm)
Vm: molecular volume of water (cm$^3$/mol)=18.079 (30° C.)
Φ: contact angle (°) of capillary tube wall with water=55°
R=gas constant (erg/deg·mol)=8.3143×10$^7$
T: absolute temperature (K)=303.15

P: saturated water vapor pressure indicated by water inside pore (mmHg)

$P_0$: saturated water vapor pressure at one atmospheric pressure (absolute pressure) and 30° C. (mmHg)=31.824

Thirteen types of sulfuric acid solution which are changed in sulfuric acid concentrations (more specifically, 11 types of sulfuric acid solution having a specific gravity of 1.05 to 1.30 at every interval of 0.025 and sulfuric acid solution which is 1.35 in specific gravity and sulfuric acid solution which is 1.40 in specific gravity) were used to perform a measurement test of saturated adsorption. In each test, determination is made for a cumulative volume of pores lower than a corresponding pore radius. The thus determined cumulative volume of pores is plotted with respect to the pore radius, thus making it possible to obtain a pore distribution curve of activated carbon. A radius showing the highest peak value in the pore distribution curve is given as a median pore radius.

N-Butane Desorption Rate of Adsorbent (%) and N-Butane Working Capacity (BWC):

1) A packing density of granular activated carbon is measured in accordance with JIS K1474.
2) After filling 24 milliliters (mL) of a sample into a glass column with an inner diameter of 17.5 mm and weighed on the basis of the packing density measured in 1) (Ag), the sample is set on a thermobath kept at 25° C.
3) After n-butane (99.9% or more in purity) is aerated into the glass column in an up flow state at a flow rate of 300 mL/minute for 20 minutes or longer, the glass column is removed to weigh the sample (Cg).
4) After the glass column is set again to the thermobath and dry air is aerated into the glass column in a down flow state at a flow rate of 240 mL/minute for 20 minutes, the glass column is removed to weigh the sample (Dg).
5) The above procedures are conducted and the n-butane desorption rate and desorption per deciliter of granular activated carbon are given as a butane working capacity (BWC) by referring to the following formula. n-butane desorption rate=(Cg−Dg)/(Cg−Ag)×100(%), BWC(g/dL)=(Cg−Dg)/0.24

Figure 1:
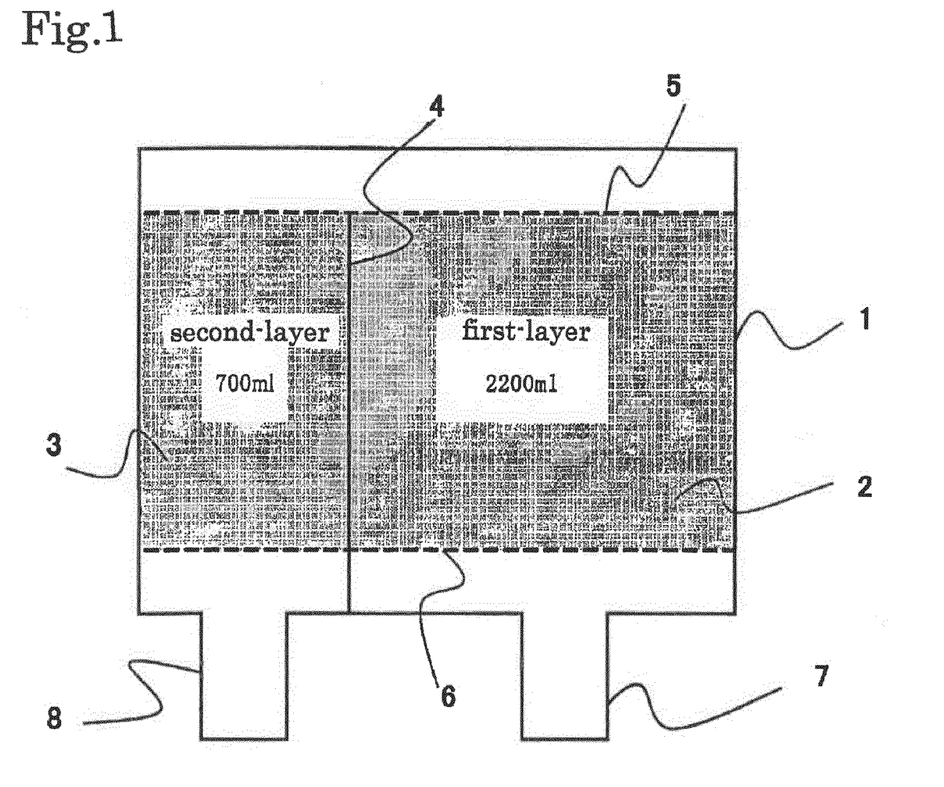
FIG. 1 is a schematic cross sectional view of a canister test machine.
Figure 2:
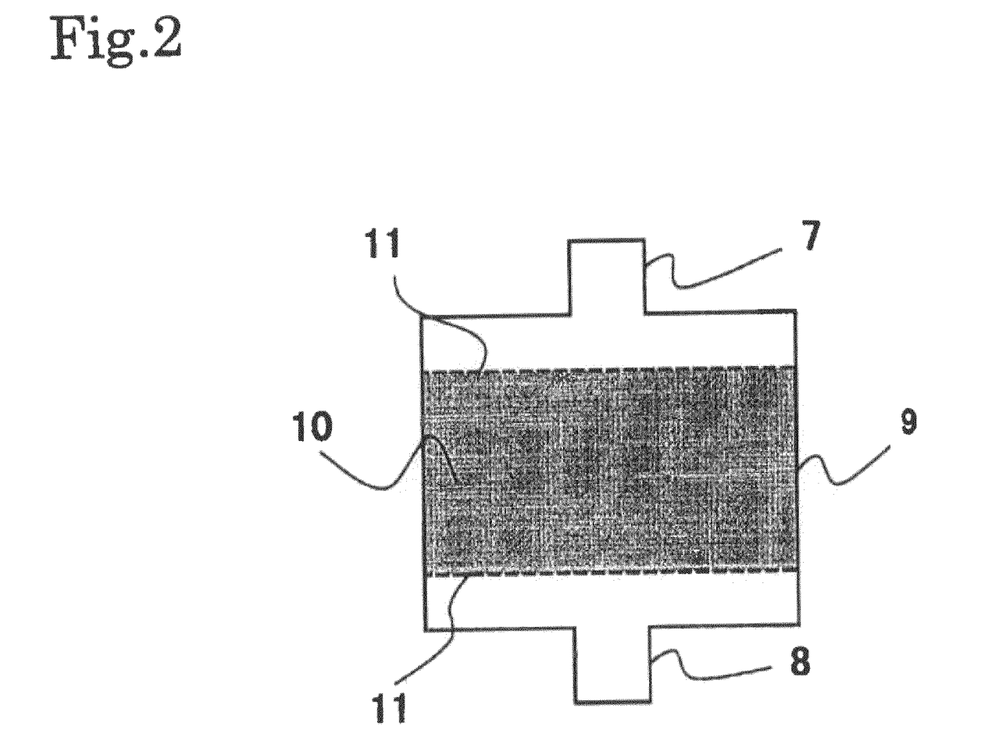
FIG. 2 is a schematic cross sectional view of a second canister test machine.

DBL:
<Prior Treatment>
1) As shown in FIG. 1, activated carbon, KURARAY COAL 3GX produced by Kuraray Chemical Co., Ltd., serving as activated carbon 2 for a first layer, and the adsorbent of the present invention, serving as activated carbon 3 for a second layer, are filled into a canister test machine 1 having an effective volume of 2,900 mL (the first layer, 2200 mL+the second layer, 700 mL) and a height/equivalent diameter, (first layer, 2.7, second layer, 3), and the lid is placed thereon. Further, as shown in FIG. 2, where a second canister test machine 9 having an inner diameter of 29 mm Φ and a length of 180 mm is connected in series, activated carbon, KURARAY COAL 3GX produced by Kuraray Chemical Co., Ltd., serving as activated carbon for the first layer, and activated carbon, 2GK-C7 produced by Kuraray Chemical Co., Ltd., serving as activated carbon for the second layer, are filled, and the adsorbent of the present invention is filled into the second canister test machine. It is noted that the equivalent diameter is a diameter of the equivalent circle where the cross section is not circular, and the adsorption volume is 3GX>2GK-C7. In FIG. 1, the numeral 4 denotes a barrier, 5 and 6 denote a dispersion plate. Further, in FIG. 2, the numeral 10 denotes an adsorbent, and 11 denotes a dispersion plate.
2) A pseudo-gasoline vapor (butane:pentane:hexane=25:50:25 ratio by volume) at 1.5 g/minute and air at 500 mL/minute are aerated into an inlet 7 of evaporated fuel gas on the canister test machine at an ambient temperature of 25° C., gas discharged from an outlet 8 of evaporated fuel gas on the canister test machine is measured for the concentration by using a hydrocarbon meter. After the concentration at the outlet of the canister test machine has arrived at 10,000 ppm (breakthrough), aeration is halted and air 400 times greater than the capacity of the canister test machine is introduced from the outlet 8 in an opposite direction to adsorption and purged.
3) The above procedures of 2) are performed at 10 cycles and the thus treated sample was allowed to stand at 25° C. over night (16 to 20 hours).
4) 50% by volume of n-butane diluted with air is aerated into the canister at 40 g/hour at an ambient temperature of 25° C., and the concentration at the outlet of the canister is measured by using a hydrocarbon meter. After arrival of the concentration at the outlet at 10,000 ppm (breakthrough), aeration is halted, and air 150 times greater than the capacity of the canister test machine is introduced from the outlet 8 in an opposite direction and purged.

Figure 3:
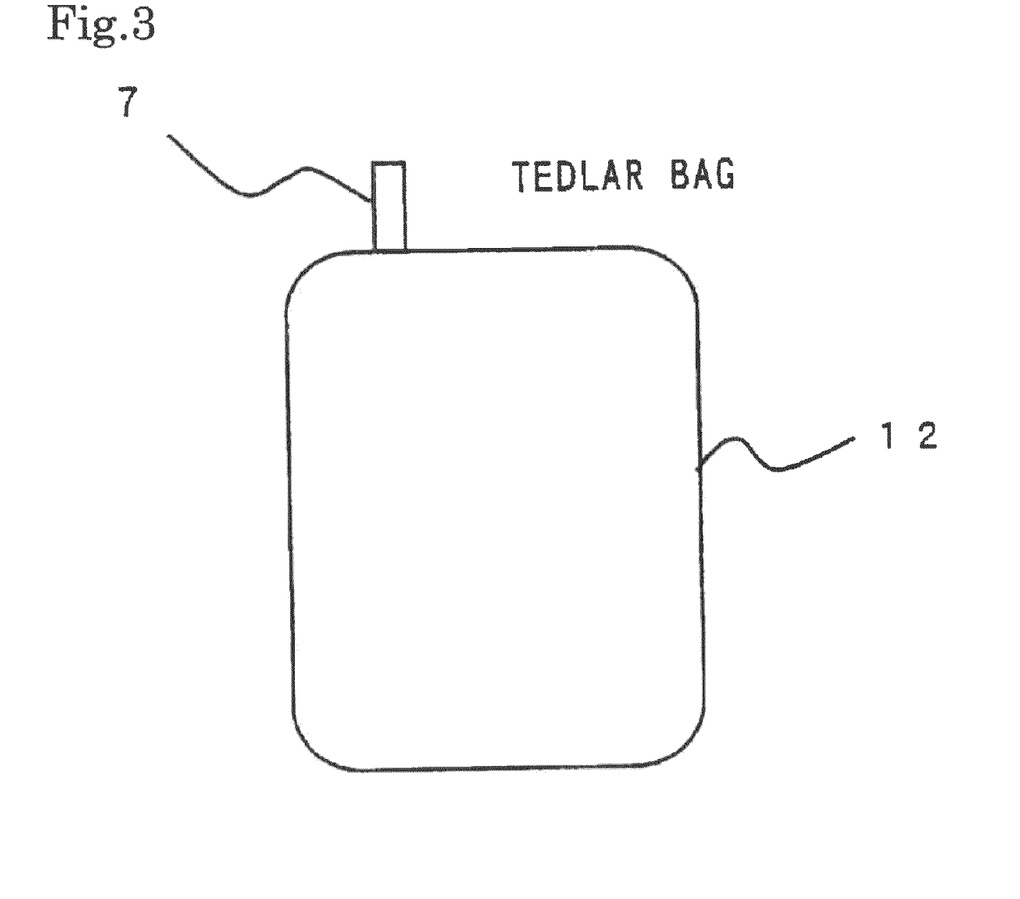
FIG. 3 is a schematic cross sectional view of a Tedlar bag.

<Measurement of DBL>
1) An ambient temperature is set at 30° C. and the sample is allowed to stand overnight (16 to 20 hours). Thereafter, a simplified DBL test is carried out.
2) A pseudo-gasoline vapor supply source is connected to the canister test machine, and the outlet of the canister test machine is connected to a Tedlar bag 12 for leakage measurement as shown in FIG. 3 by using a pipe or hose. The Tedlar bag is a gas collecting bag which causes no adsorption or infiltration of gas, and Tedlar is a registered trademark of DuPont.
3) A pseudo-gasoline vapor at 0.19 g/minute and air at 63 mL/minute are aerated in the canister test machine, and leakage amount is measured at an ambient temperature of 35° C.×1.5 hours, 35° C.×0.5 hour+40° C.×1 hour, 40° C.×1 hour (First day).
4) An ambient temperature is set at 30° C. and the sample is allowed to stand for two hours, thereafter, air is purged at a flow rate of 100 mL/minute. Then, the sample is allowed to stand for 17 hours.
5) A pseudo-gasoline vapor at 0.143 g/minute and air at 47.3 mL/minute are aerated in the canister test machine, and a leakage amount is measured at an ambient temperature of 35° C.×2 hours and 40° C.×2 hours (Second day).
6) The gas concentration is determined by using a gas chromatograph, the gas volume is measured by using a gas meter, the leakage amount is determined by (concentration)×(volume) of the gas inside the Tedlar bag. Hereinafter, the present invention is described in more detail based on concrete examples, however, the present invention shall not to be limited to these. Mixture ratios are all based on parts by weight.

Equilibrium Adsorption at an N-Butane Volume Concentration of 2,000 ppm
1) The adsorbent is measured for packing density in accordance with JIS K1474.
2) After filling 24 milliliters (mL) of a sample into a glass column having an inner diameter of 17.5 mm on the basis of the packing density measured in 1) and weighed (Ag), the sample is set in a thermobath kept at 25° C.
3) After n-butane (2,000 ppm) is aerated into a glass column in an up flow state at a flow rate of 300 mL/minute for 20 minutes or longer, the glass column is removed to weigh the sample (C1g).
4) The glass column is set in the thermobath again, and the procedures 3 are repeated to weigh the sample (C2g).
5) The procedures 4 are performed up to a final weight (Cng) where no increase in weight is found, an equilibrium adsorption at an n-butane volume concentration of 2,000 ppm is calculated by referring to the following formula. Equilibrium adsorption at an n-butane volume concentration of 2,000 ppm=(Cng−A)/0.24.

Measurement of volume of pores with a mercury porosimeter Measurement was made by using a pore-size-distribution measuring apparatus (AUTOPORE 9510) made by Shimadzu Corporation.

Examples 1 to 12 and Comparative Examples 1 to 6 KURARAY COAL 3GX produced by Kuraray Chemical Co., Ltd., was placed into a rotary kiln, subjected to steam activation at temperatures of 920 to 950° C., and the activation time was changed to obtain four types of activated carbon, that is, those with median pore radii of 3.3, 4.2, 4.8 and 5.0 nm. Of these types, that of 4.8 nm showed an n-butane adsorption of 50%, a desorption rate of 77% and BWC of 11.9 g/dL in accordance with the BWC method.

These types of activated carbon were pulverized into those with a particle size of 0.1 mm or less by using a pulverizer to produce powdery activated carbon (A). Then, aluminum oxide of Wako Pure Chemical Industries, Ltd., graphite powder (100 μm or less) of Wako Pure Chemical Industries, Ltd., or silicate of Wako Pure Chemical Industries, as an aggregate (B), an acid-soluble calcium carbonate cast stone KD-100 of Calfine Co., Ltd., as an inorganic compound soluble in acid (C), acryl emulsion Nikazol FX-6074 of Nippon Carbide Industries Co., Inc., or polyurethane emulsion KMN-NOc produced by Kuraray Co., Ltd., as a binder (D), and bentonite of Hojun Co., Ltd., (product name, "Bengel") or carboxymethyl cellulose (hereinafter abbreviated as CMC) as a smoothing agent (E) were mixed with the powdery activated carbon (A), and water (F) was added thereto, and a resultant was well kneaded. Thereafter, the resultant was extruded and granulated by using a hydraulic granulating machine. The granular activated carbon can be adjusted for size arbitrarily by changing the pore size of a die and, the die used in this instance, was 2.5 mm in diameter.

After the thus granulated product was dried by a drier kept at 120° C. for 16 hours, it was subjected to particle size regulation at a length of 1.5 to 10 mm, and 250 mL of the resultant was submerged in 5 liters of hydrochroric acid at 1-N concentration for 16 hours. Thereafter, water was removed and the resultant was washed with water, while being stirred in five liters of water, and again washed with water. After these procedures were repeated ten times, the resultant was dried at 120° C. and, thereafter, subjected to particle size regulation with a sieve having sieve opening of 3.35 mm and with a sieve having sieve opening of 2.00 mm, and the remainder left on the sieve having sieve opening of 2.00 mm was used as a sample.

Where an integrated volume of pores having an average pore diameter of 3,000 to 100,000 nm as measured with a mercury porosimeter was 6.5 mL or more and an equilibrium adsorption as measured in an n-butane volume concentration of 2,000 ppm was less than 0.16 g/dL, these samples were given as Comparative Example 1 and Comparative Example 4. Where an integrated volume of pores having an average pore diameter of 3,000 to 100,000 mm as measured with a mercury porosimeter was less than 6.5 mL and an equilibrium adsorption as measured in an n-butane volume concentration of 2,000 ppm was 0.16 g/dL or more, these samples were given as Comparative Example 2 and Comparative Example 5. Where no washing by acid was carried out and the inorganic compound soluble in acid (C) was left as it was, these samples were given as Comparative Example 3 and Comparative Example 6.

Activated carbon produced by Kuraray Chemical Co., Ltd., KURARAY COAL 3GX, serving as first-layer activated carbon, and the granular activated carbon of the present invention, serving as second-layer activated carbon, were filled into a canister having an effective volume of 2,900 mL (the first layer, 2,200 mL+the second layer 700 mL) and a height/equivalent diameter (the first layer, 2.7 and the second layer, 3), thereby measuring the DBL performance. The results of Examples 1 to 5 and Comparative Examples 1 to 3 are shown in Table 1.

Activated carbon produced by Kuraray Chemical Co., Ltd., KURARAY COAL 3GX, serving as first-layer activated carbon, and activated carbon produced by Kuraray Chemical Co., Ltd., KURARAY COAL 2GK-C7, serving as second-layer activated carbon, were filled into a canister having an effective volume of 2,900 mL (the first layer 2,200 mL+the second layer 700 mL) and a height/equivalent diameter (the first layer, 2.7 and the second layer, 3). And the granular activated carbon of the present invention as third-layer activated carbon was filled into a glass column having an inner diameter of 29 mm Φ and a length of 180 mm. A wire cloth of JIS 18 mesh was rounded to adjust a space and also give a dispersion plate, and a rubber stopper having a glass tube with an outer diameter of 8 mm Φ on both ends was attached to connect with the canister. Then, the DBL performance was measured and the results of Examples 6 to 12 and Comparative Examples 4 to 6 are shown in Table 1.

TABLE 1

| | | Mixture ratio (parts by weight) | | | | | | | |
|---|---|---|---|---|---|---|---|---|---|
| | | Activated carbon pore radius nm | Activated carbon parts by weight | Aggregate parts by weight | Smoothing agent (on dry solid basis) parts by weight | Binder parts by weight | Calcium carbonate parts by weight | Water parts by weight | Washing by acid water |
| Example | 1 | 4.8 | 45 | Graphite 55 | CMC 4 | FX6074 17 | 20 | 95 | ○ |
| | 2 | 4.2 | 45 | Graphite 55 | CMC 4 | FX6074 17 | 50 | 105 | ○ |
| | 3 | 4.8 | 35 | Alumina 65 | CMC 4 | KMN-NOc 17 | 100 | 90 | ○ |
| | 4 | 5 | 35 | Alumina 65 | CMC 4 | FX 6074 17 | 150 | 95 | ○ |
| | 5 | 3.3 | 35 | Alumina 65 | CMC 4 | FX 6074 20 | 300 | 100 | ○ |
| | 6 | 4.8 | 35 | Silicate 65 | CMC 4 | FX 6074 17 | 100 | 85 | ○ |
| | 7 | 3.3 | 35 | Alumina 65 | Bengel 4 | FX 6074 20 | 300 | 100 | ○ |
| | 8 | 5 | 35 | Alumina 65 | CMC 5 | FX 6074 22 | 400 | 120 | ○ |
| | 9 | 4.8 | 55 | Alumina 45 | CMC 5 | FX 6074 24 | 300 | 120 | ○ |
| | 10 | 4.8 | 70 | Alumina 30 | CMC 4 | FX 6074 25 | 300 | 155 | ○ |

TABLE 1-continued

|  |  |  |  |  |  |  |  |  |  |  |
|---|---|---|---|---|---|---|---|---|---|---|
|  | 11 | 2 + 4.8 | 100 | — | CMC 4 | FX 6074 27 | 300 | 210 | ○ |  |
|  | 12 | 4.8 | 100 | — | CMC 4 | FX 6074 25 | 200 | 214 | ○ |  |
| Comparative Example | 1 | 4.8 | 10 | Alumina 90 | CMC 5 | FX 6074 24 | 400 | 90 | ○ |  |
|  | 2 | 3.3 | 90 | Alumina 10 | CMC 4 | FX 6074 17 | 10 | 200 | ○ |  |
|  | 3 | 5 | 35 | Alumina 65 | CMC 4 | FX 6074 20 | 300 | 100 | x |  |
|  | 4 | 4.8 | 10 | Alumina 90 | CMC 5 | FX 6074 24 | 400 | 90 | ○ |  |
|  | 5 | 3.3 | 90 | Alumina 10 | CMC 4 | FX 6074 17 | 10 | 200 | ○ |  |
|  | 6 | 5 | 35 | Alumina 65 | CMC 4 | FX 6074 20 | 300 | 100 | x |  |

|  |  | Desorption rate % | BWC (a) g/dl | Equilibrium adsorption at n-butane volume concentartion of 2,000 ppm g/dl | Integrated volume of pores having an average pore diameter of 3,000-100,000 nm (mL/dl) | Siteused | Amount used (b) mL | axb/100 g | DBL mg |
|---|---|---|---|---|---|---|---|---|---|
| Example | 1 | 87.4 | 5.30 | 0.36 | 7.6 | Second chamber | 700 | 37.1 | 25.0 |
|  | 2 | 88.1 | 5.08 | 0.32 | 9.8 | Second chamber | 700 | 35.6 | 25.2 |
|  | 3 | 90.4 | 3.70 | 0.32 | 12.8 | Second chamber | 700 | 25.9 | 26.5 |
|  | 4 | 89.3 | 3.93 | 0.27 | 17.3 | Second chamber | 700 | 27.5 | 25.9 |
|  | 5 | 94.2 | 3.29 | 0.22 | 22.3 | Second chamber | 700 | 23.0 | 27.5 |
|  | 6 | 90.5 | 4.38 | 0.32 | 12.9 | Second canister | 66 | 2.9 | 9.7 |
|  | 7 | 94.2 | 3.15 | 0.22 | 22.4 | Second canister | 66 | 2.1 | 23.7 |
|  | 8 | 94.3 | 3.05 | 0.16 | 25.5 | Second canister | 89 | 2.7 | 7.4 |
|  | 9 | 88.0 | 4.29 | 0.19 | 22.3 | Second canister | 66 | 2.8 | 15.3 |
|  | 10 | 88.7 | 4.82 | 0.19 | 22.5 | Second canister | 66 | 3.2 | 11.3 |
|  | 11 | 85.6 | 5.62 | 0.18 | 22.4 | Second canister | 66 | 3.7 | 9.5 |
|  | 12 | 85.3 | 6.12 | 0.22 | 20.9 | Second canister | 66 | 4.0 | 7.6 |
| Comparative Example | 1 | 95.4 | 2.11 | 0.14 | 25.3 | Second chamber | 700 | 14.8 | 41.2 |
|  | 2 | 82.1 | 7.60 | 0.36 | 6.4 | Second chamber | 700 | 53.2 | 42.4 |
|  | 3 | 91.6 | 3.13 | 0.19 | 0.9 | Second chamber | 700 | 21.9 | 54.6 |
|  | 4 | 95.4 | 2.11 | 0.14 | 25.3 | Second canister | 66 | 1.4 | 39.6 |
|  | 5 | 82.1 | 7.60 | 0.36 | 6.4 | Second canister | 66 | 5.0 | 40.3 |
|  | 6 | 91.6 | 3.13 | 0.19 | 0.9 | Second canister | 66 | 2.1 | 48.7 |

Figure 4:
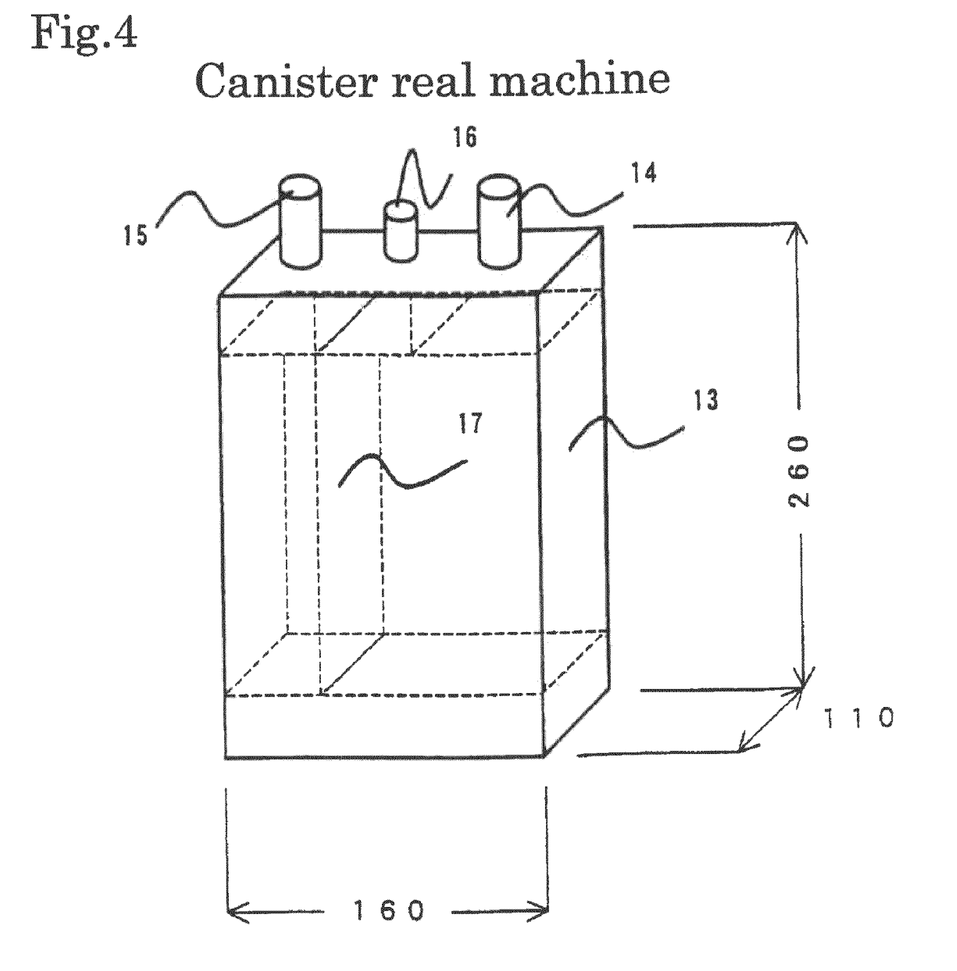
FIG. 4 is a schematic perspective view of one example of the canister.

A canister to be mounted on a motor vehicle is practically the same as the previously described canister test machine. FIG. 4 is a schematic perspective view of one example of the canister in a rectangular solid shape (160 mm×110 mm×260 mm). The numeral 13 denotes a canister real machine; 14, an evaporated fuel gas inhalation port; 15, an atmosphere port, and 16, a purge port. The numeral 17 denotes a barrier for separating the first layer from the second layer. FIG. 4 shows an example of one unit of a canister, which may be carried out in a state of being connected to a second canister via a hose or the like (not illustrated).

INDUSTRIAL APPLICABILITY

The present invention provides an adsorbent, a method for producing the adsorbent, a canister and a method for using the canister. Since the adsorbent of the present invention shows a great adsorption performance and adsorption/desorption rates, it is favorably used as an evaporated fuel gas adsorbent for a canister effective in preserving the environment. Where a motor vehicle and others are allowed to park for a prolonged period of time, it is possible to reduce the amount of evaporated fuel gas released into the atmosphere. This adsorbent is in particular favorably used as an adsorbent to be filled into a second layer and a subsequent layer of a canister. This adsorbent is applicable not only to canisters but also to various uses such as removal of odors, recovery of solvents and functions of catalysts, and important in many industries.

| Description of Reference Numerals | |
|---|---|
| 1: | Canister test machine |
| 2: | First layer adsorbent |
| 3: | Second layer adsorbent |
| 4: | Barrier |
| 5: | Dispersion plate |
| 6: | Dispersion plate |
| 7: | Evaporated fuel gas inhalation port |
| 8: | Atmosphere port |
| 9: | Second canister test machine |
| 10: | Adsorbent |
| 11: | Dispersion plate |
| 12: | Tedlar bag |
| 13: | Canister real machine |
| 14: | Evaporated fuel gas inhalation port |
| 15: | Atmosphere port |
| 16: | Purge port |
| 17: | Barrier |

What is claimed is:

1. An adsorbent in which an integrated volume of pores having an average diameter of 3,000 to 100,000 nm as measured with a mercury porosimeter is 6.5 mL/dl or more and an equilibrium adsorption as measured in an n-butane volume concentration of 2,000 ppm is 0.16 g/dL or more.

2. The adsorbent according to claim 1, wherein the adsorbent is in the form of a pellet, in the form of a granule, or in the form of a sphere.

3. The adsorbent according to claim 2, wherein the adsorbent is an adsorbent for adsorbing evaporated fuel gas.

4. A canister having the evaporated fuel gas adsorbent as set forth in claim 3.

5. The adsorbent according to claim 1, wherein the adsorbent is an adsorbent for adsorbing evaporated fuel gas.

6. A canister having the evaporated fuel gas adsorbent as set forth in claim 5.

* * * * *